United States Patent
Kunitake et al.

(10) Patent No.: US 9,560,488 B2
(45) Date of Patent: Jan. 31, 2017

(54) BAN SYSTEM, TERMINAL APPARATUS, BAN COMMUNICATIONS METHOD, AND COMPUTER PRODUCT

(71) Applicant: FUJITSU LIMITED, Kawasaki-shi, Kanagawa (JP)

(72) Inventors: Toshihiro Kunitake, Kawasaki (JP); Hiroki Akano, Kawasaki (JP); Yuki Iwamasa, Kawasaki (JP); Eiji Matsumoto, Kawasaki (JP); Ichirou Ida, Yokohama (JP); Tatsuya Kikuzuki, Sodegaura (JP); Kazumi Kasai, Shibuya (JP); Teruhisa Ninomiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 14/751,376

(22) Filed: Jun. 26, 2015

(65) Prior Publication Data
US 2016/0057582 A1   Feb. 25, 2016

(30) Foreign Application Priority Data
Aug. 25, 2014   (JP) ................................ 2014-170813

(51) Int. Cl.
*H04W 76/02* (2009.01)
*H04W 40/34* (2009.01)
(Continued)

(52) U.S. Cl.
CPC .............. *H04W 4/027* (2013.01); *H04Q 9/00* (2013.01); *H04W 4/008* (2013.01); *H04W 8/005* (2013.01); *H04W 84/18* (2013.01)

(58) Field of Classification Search
CPC ......... H04Q 9/00; H04W 4/008; H04W 4/027; H04W 84/18; H04W 8/005; H04W 48/04; H04W 4/02
(Continued)

(56) References Cited

U.S. PATENT DOCUMENTS

2011/0246123 A1* 10/2011 DelloStritto ............. A61B 5/11
                                                              702/141
2012/0106397 A1    5/2012 Abedi
(Continued)

FOREIGN PATENT DOCUMENTS

JP    2009-188764    8/2009
JP    2010-056642    3/2010
(Continued)

OTHER PUBLICATIONS

Extended European Search Report date Feb. 3, 2016 for corresponding European Patent Application No. 15177651.5, 4 pages.
(Continued)

*Primary Examiner* — Inder Mehra
(74) *Attorney, Agent, or Firm* — Fujitsu Patent Center

(57) ABSTRACT

A BAN system includes multiple terminal apparatuses connected by wireless communication, where a terminal apparatus of the multiple terminal apparatuses is configured to identify in which direction acceleration has changed, the direction being identified based on a measurement result of a sensor of the terminal apparatus, the sensor being configured to measure acceleration; and to refer to information that specifies corresponding to places where the plurality of terminal apparatuses is to be attached to a body, directions in which acceleration changes when the body performs a given behavior, and determines based on the identified direction, a place where the terminal apparatus is attached to the body.

9 Claims, 16 Drawing Sheets

(51) Int. Cl.
  *H04W 4/00*   (2009.01)
  *H04W 4/02*   (2009.01)
  *H04W 8/00*   (2009.01)
  *H04W 84/10*  (2009.01)
  *H04Q 9/00*   (2006.01)
  *H04W 84/18*  (2009.01)

(58) Field of Classification Search
  USPC .................................. 455/456.1; 434/65–66
  See application file for complete search history.

(56) References Cited

U.S. PATENT DOCUMENTS

| 2012/0190299 A1 | 7/2012 | Takatsuka et al. |
| 2013/0023214 A1 | 1/2013 | Wang et al. |

FOREIGN PATENT DOCUMENTS

| JP | 2012-157006 | 8/2012 |
| JP | 2012-519993 | 8/2012 |
| JP | 2013-524667 | 6/2013 |
| WO | 2009-013708 A2 | 1/2009 |

OTHER PUBLICATIONS

Extended European Search Report date Feb. 3, 2015 for corresponding European Patent Application No. 15177651.5, 4 pages.

* cited by examiner

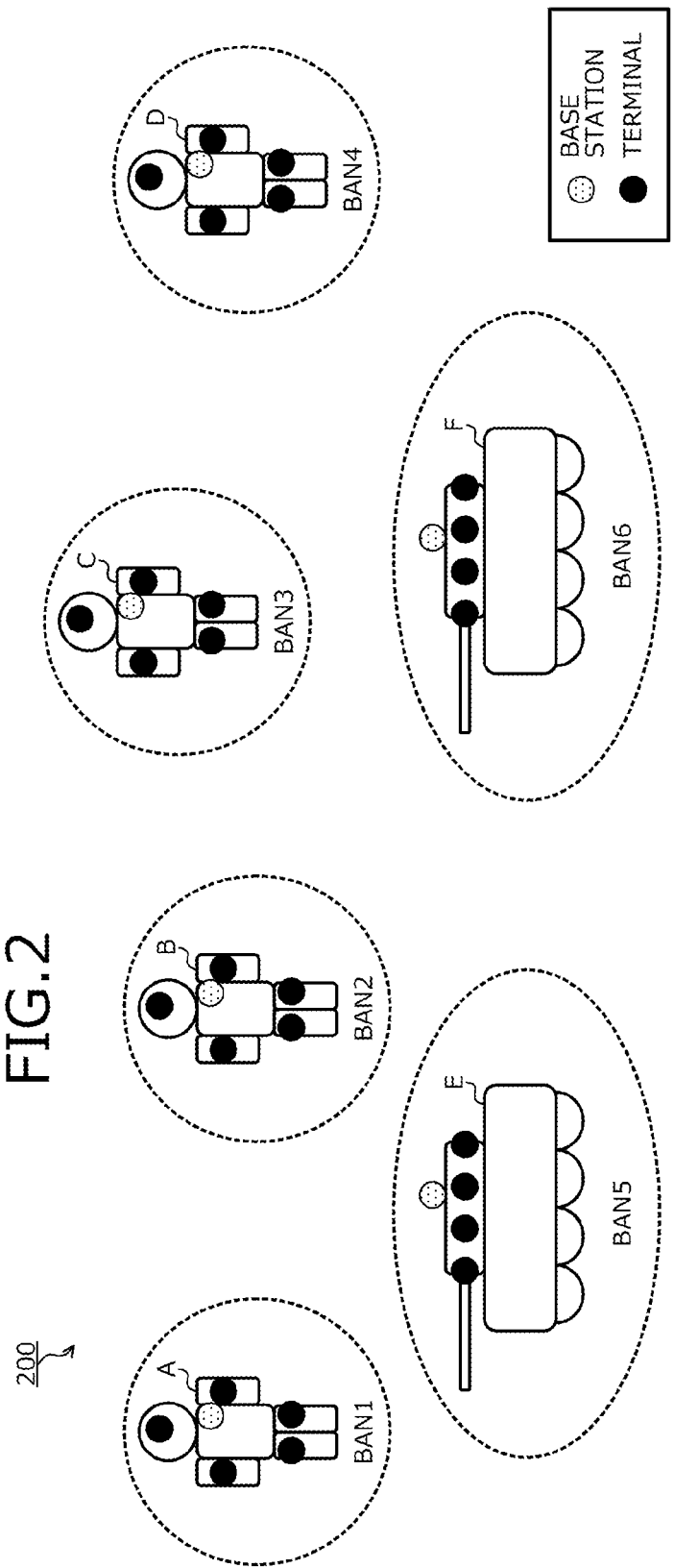

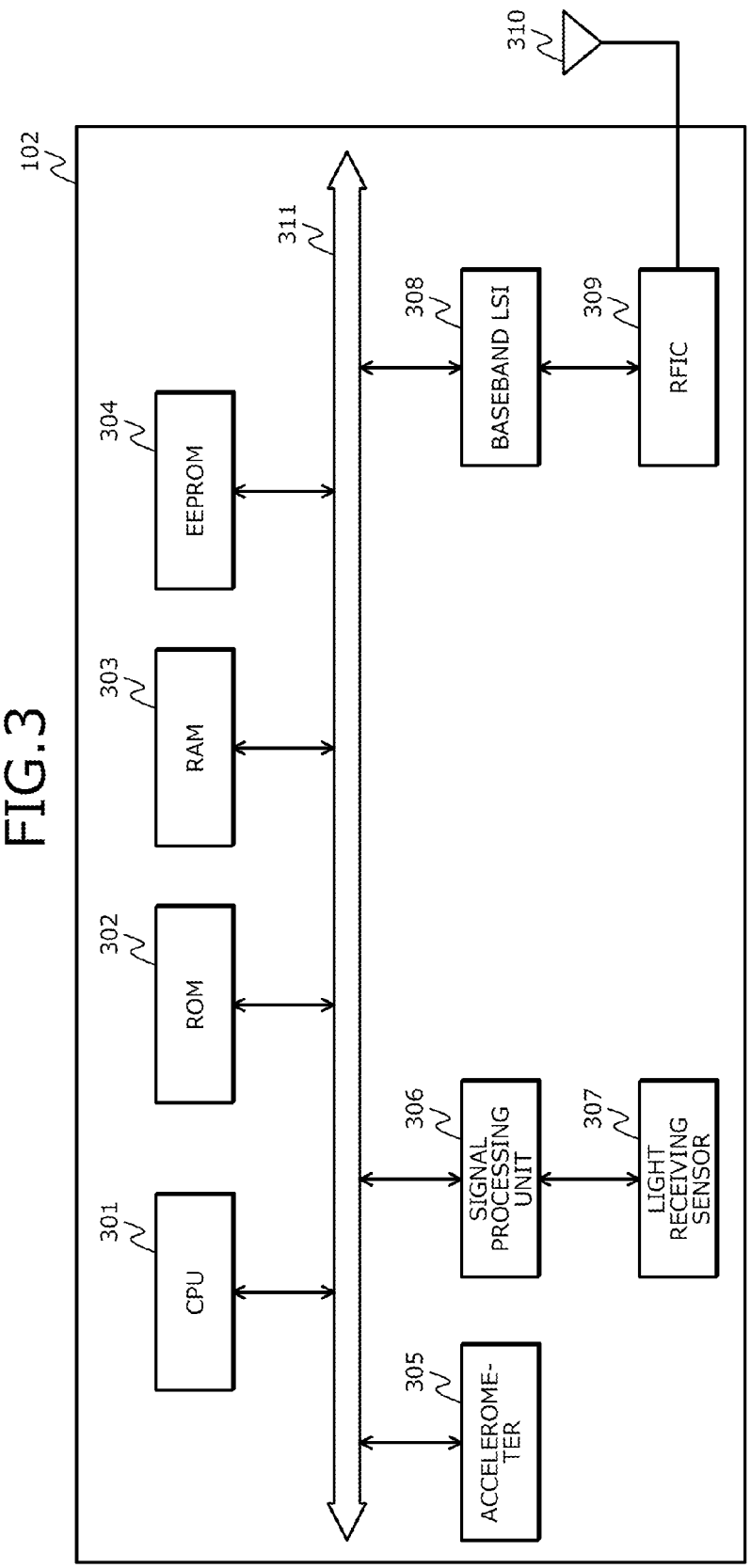

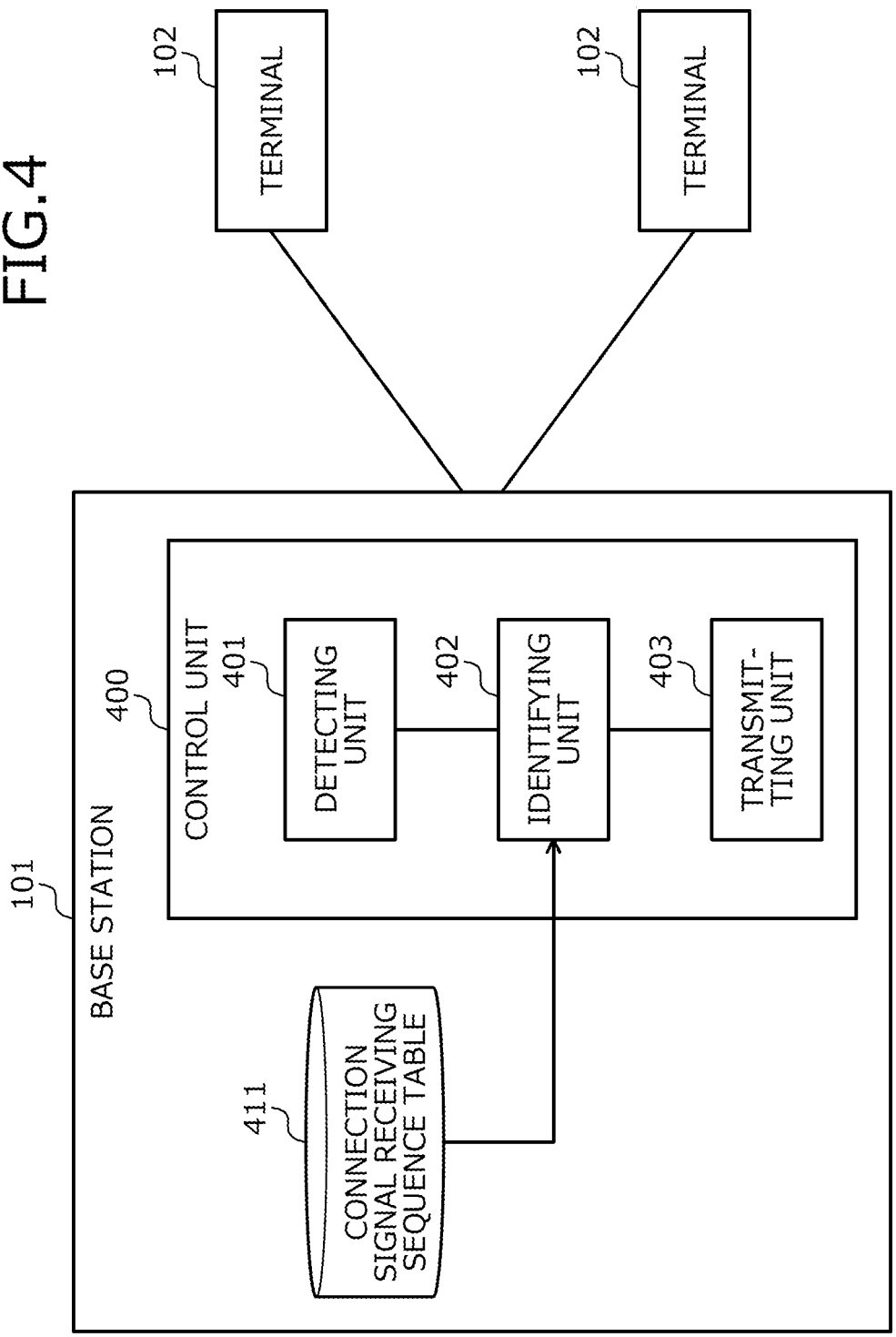

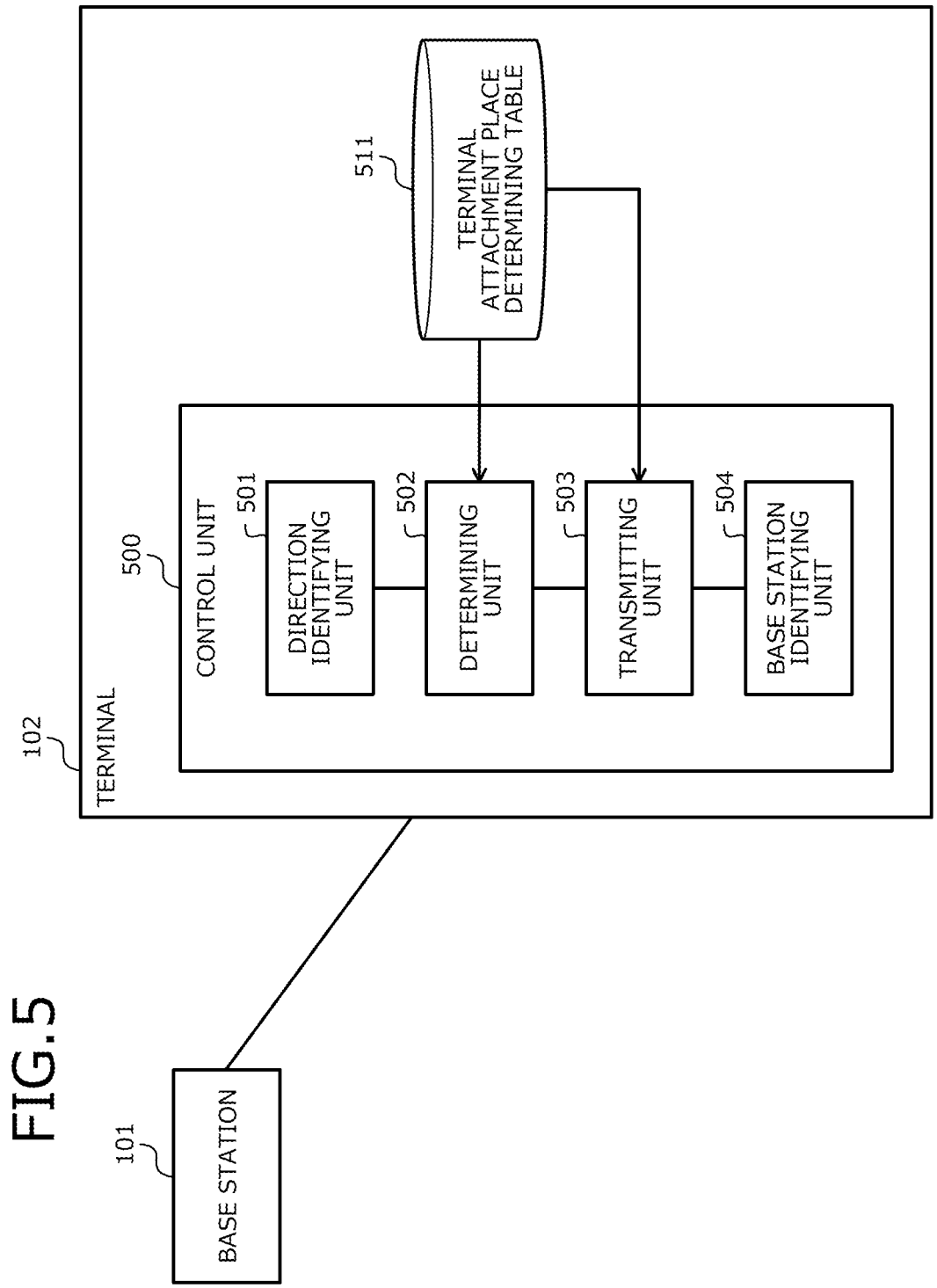

FIG.7

TERMINAL ATTACHMENT PLACE DETERMINING TABLE ~ 511-eg1

| X-AXIS ACCELERATION | Y-AXIS ACCELERATION | Z-AXIS ACCELERATION | TERMINAL ATTACHMENT PLACE | CONNECTION SIGNAL TRANSMITTING SEQUENCE | |
|---|---|---|---|---|---|
| + → - | 0 | 0 | HEAD | 1 | ~ 701-eg1-1 |
| - → + | 0 | 0 | BACKPACK | 2 | ~ 701-eg1-2 |
| 0 | + → - | 0 | RIGHT ARM | 3 | ~ 701-eg1-3 |
| 0 | - → + | 0 | LEFT ARM | 4 | ~ 701-eg1-4 |
| 0 | 0 | + → - | RIGHT LEG | 5 | ~ 701-eg1-5 |
| 0 | 0 | - → + | LEFT LEG | 6 | ~ 701-eg1-6 |

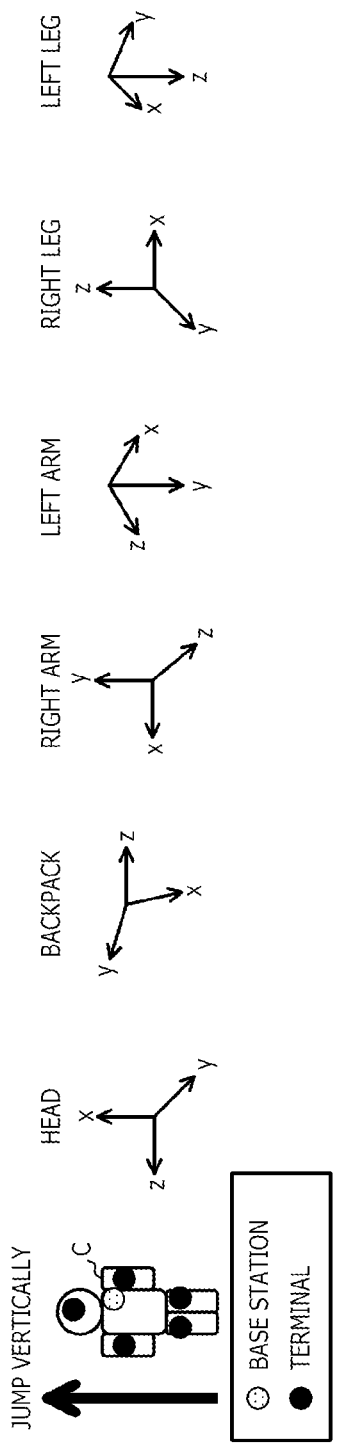
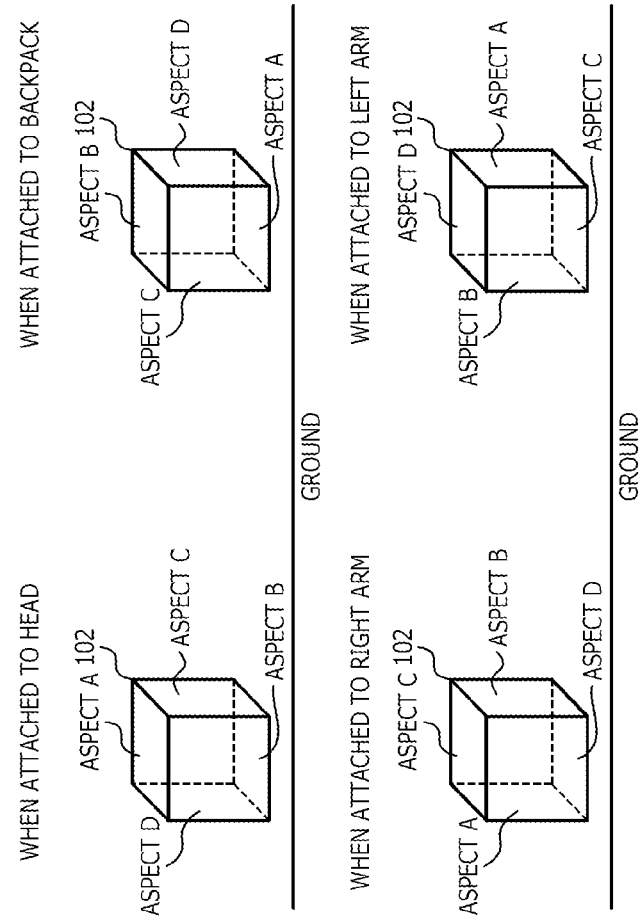
FIG.8A
FIG.8B

FIG.10

TERMINAL ATTACHMENT PLACE DETERMINING TABLE ~ 511-eg2

| X-AXIS ACCELERATION | Y-AXIS ACCELERATION | Z-AXIS ACCELERATION | TERMINAL ATTACHMENT PLACE | CONNECTION SIGNAL TRANSMITTING SEQUENCE | |
|---|---|---|---|---|---|
| + → − | 0 | 0 | FRONT | 1 | ~ 1001-eg2-1 |
| − → + | 0 | 0 | BACK | 2 | ~ 1001-eg2-2 |
| 0 | + → − | 0 | RIGHT FRONT SIDE | 3 | ~ 1001-eg2-3 |
| 0 | − → + | 0 | LEFT FRONT SIDE | 4 | ~ 1001-eg2-4 |
| 0 | 0 | + → − | RIGHT REAR SIDE | 5 | ~ 1001-eg2-5 |
| 0 | 0 | − → + | LEFT REAR SIDE | 6 | ~ 1001-eg2-6 |

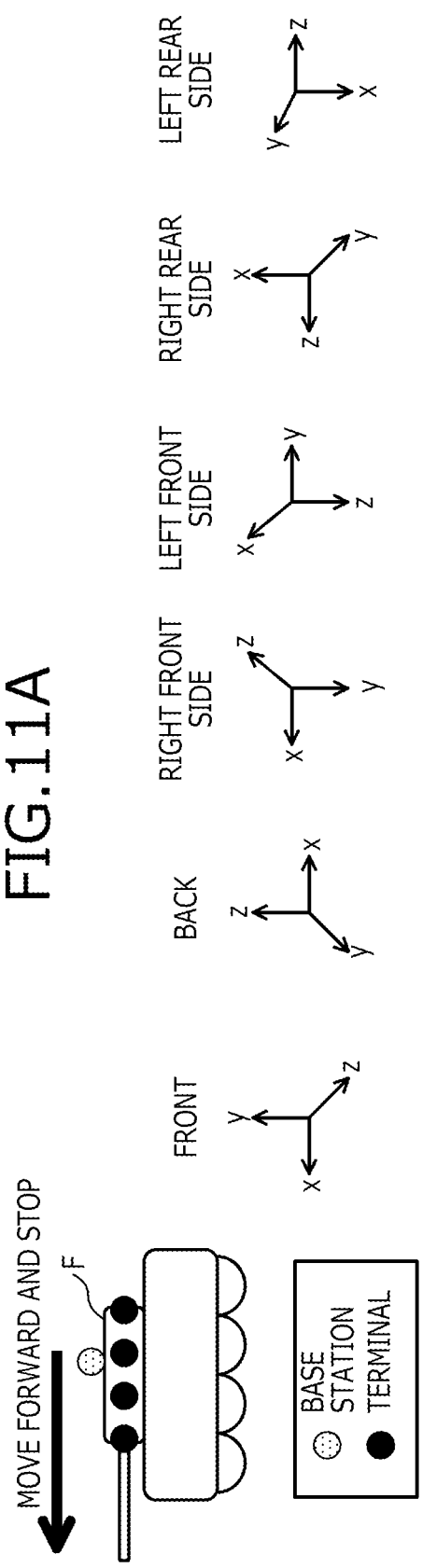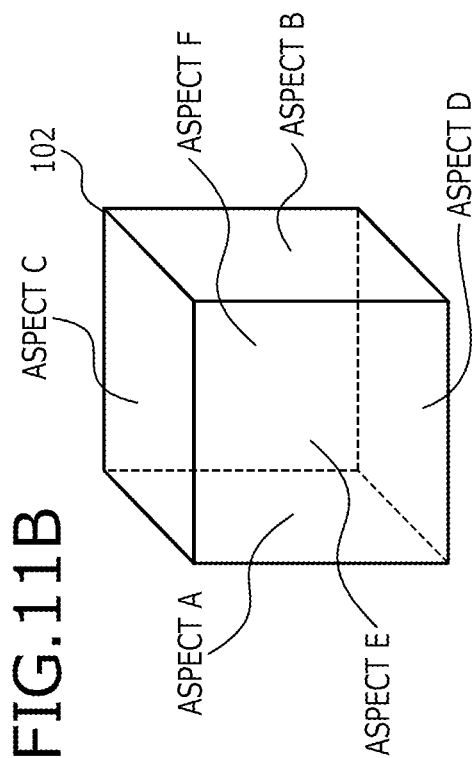

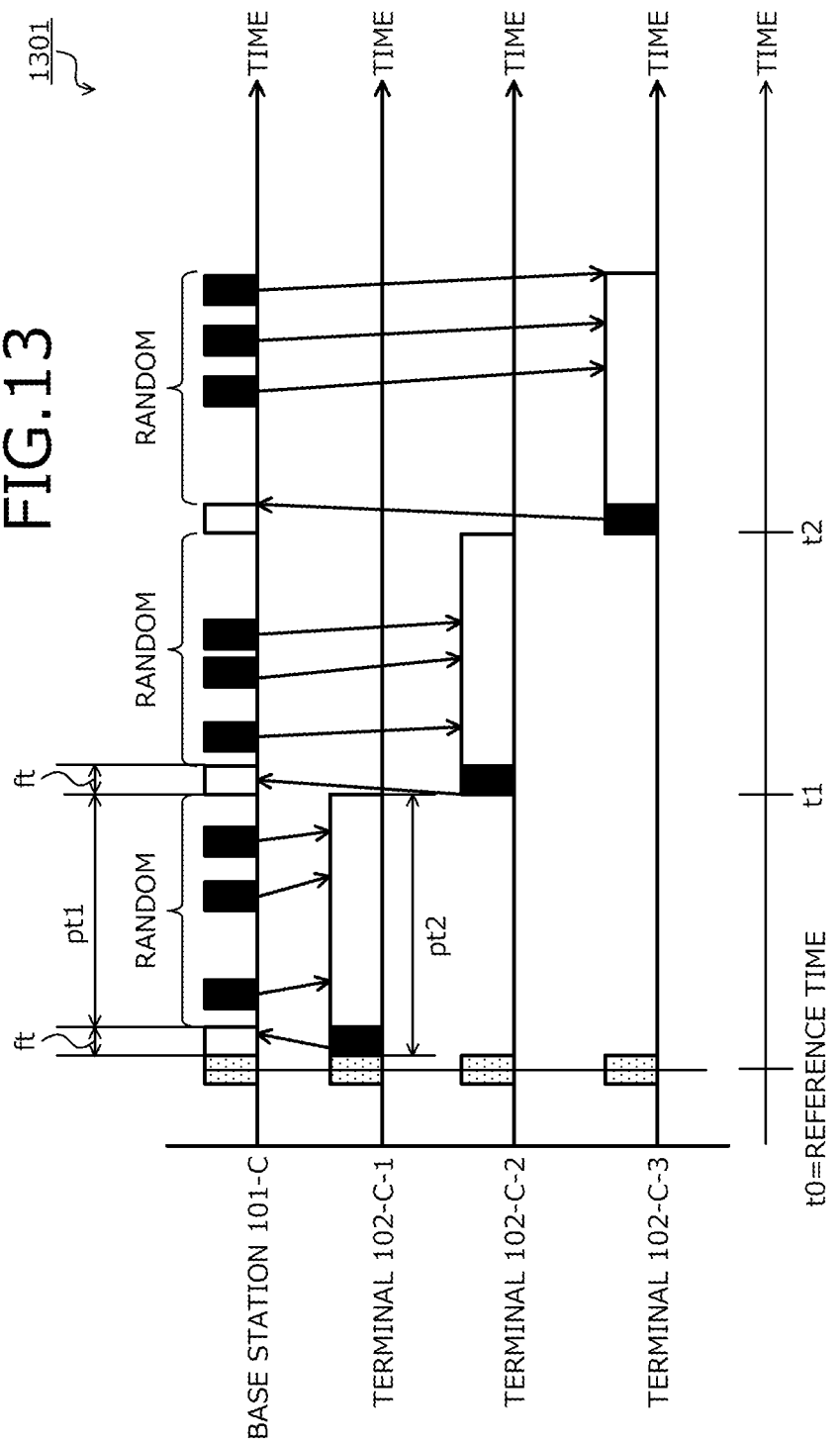

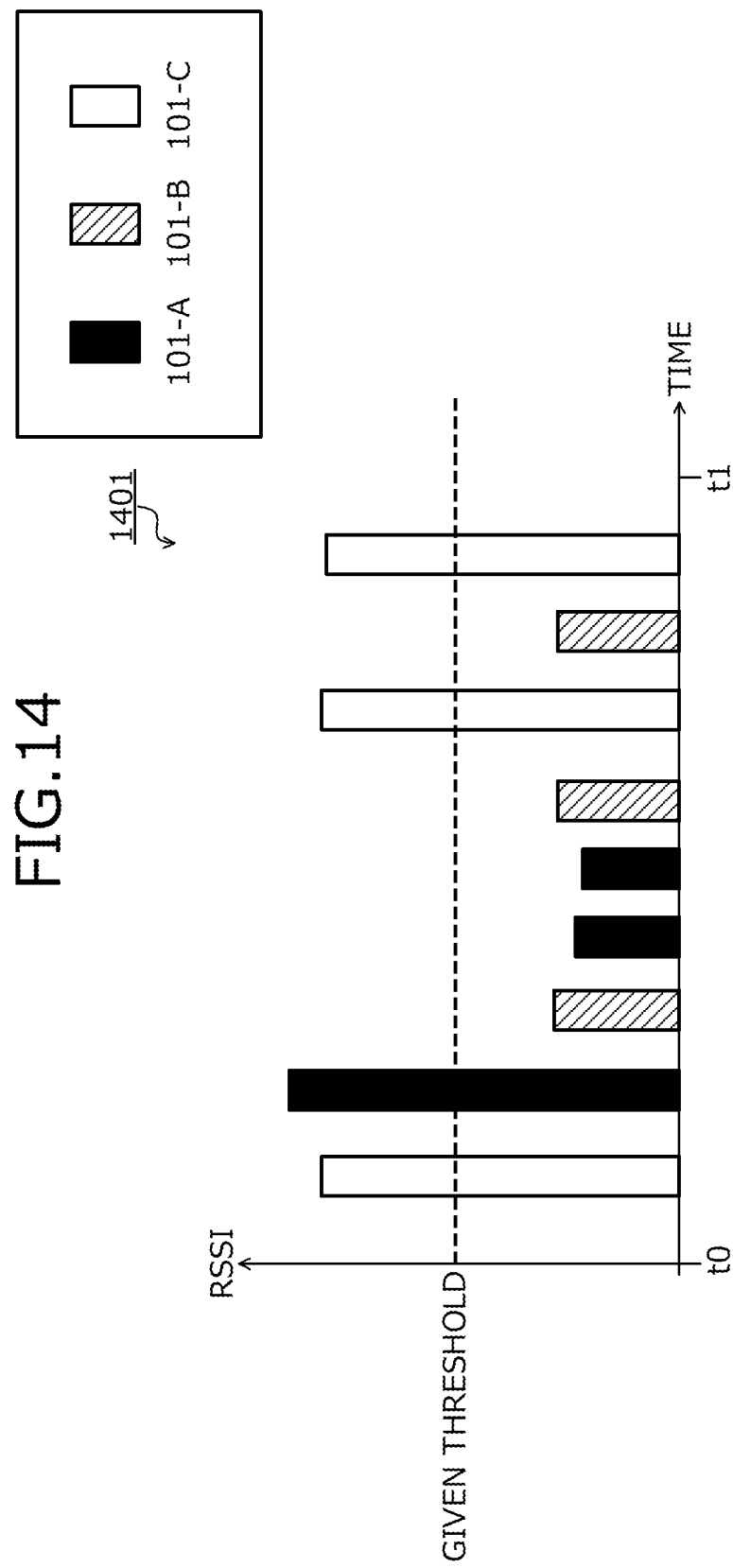

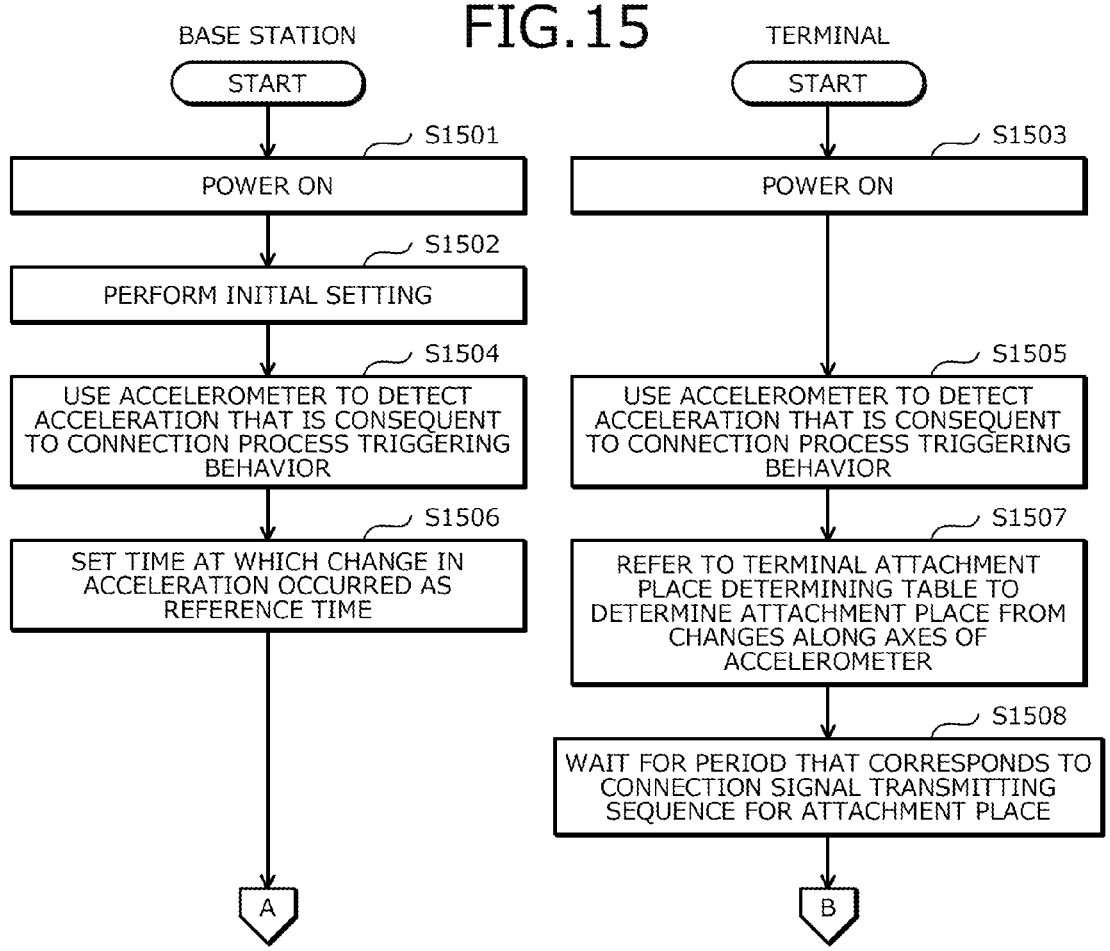

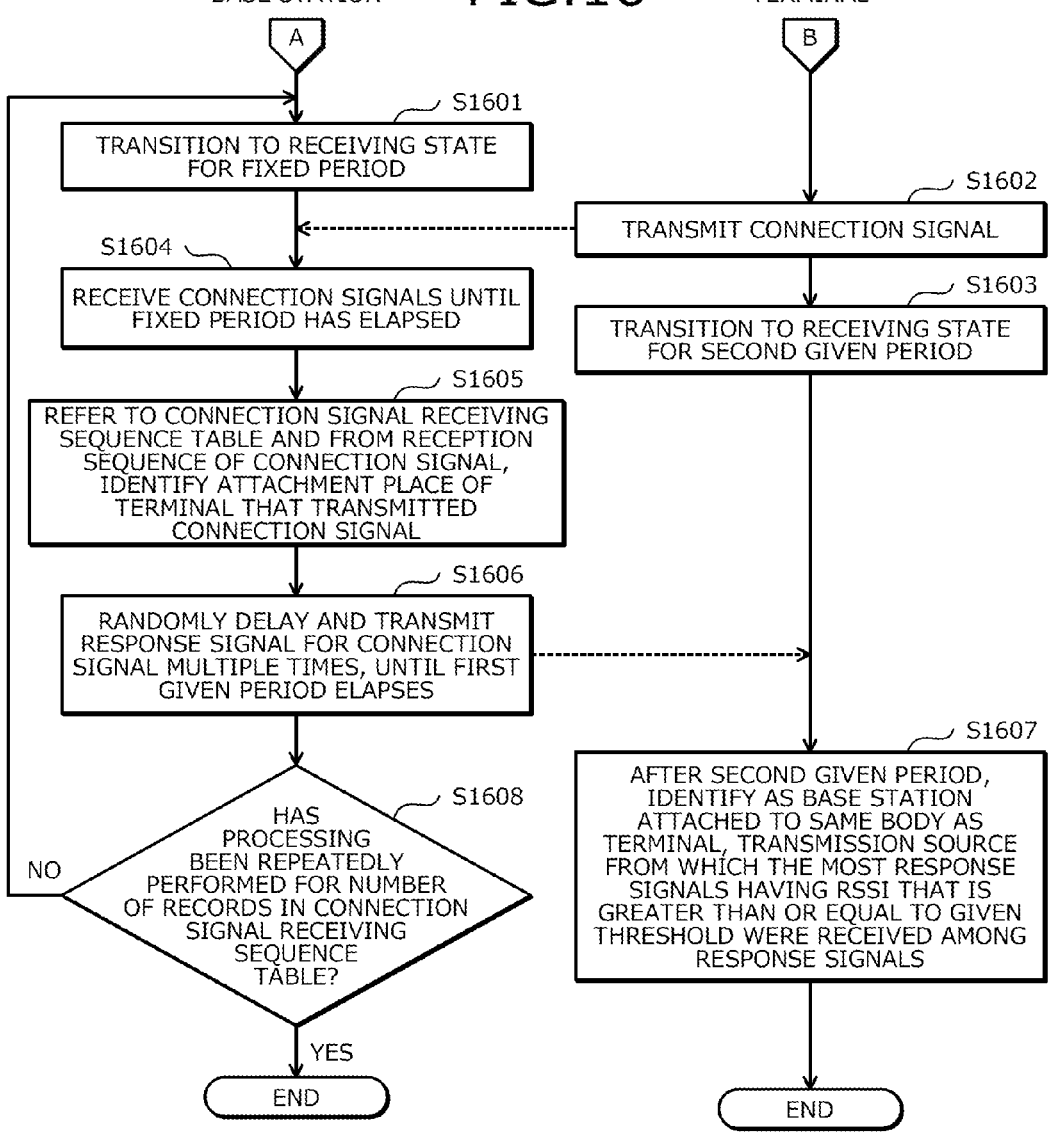

BAN SYSTEM, TERMINAL APPARATUS, BAN COMMUNICATIONS METHOD, AND COMPUTER PRODUCT

CROSS REFERENCE TO RELATED APPLICATIONS

This application is based upon and claims the benefit of priority of the prior Japanese Patent Application No. 2014-170813, filed on Aug. 25, 2014, the entire contents of which are incorporated herein by reference.

FIELD

The embodiment discussed herein is related to a body area network (BAN) system, a terminal apparatus, a BAN communications method, and a computer product.

BACKGROUND

In a conventional BAN system, terminal apparatuses are attached to bodies and connected by wireless communication. An example of BAN system application is the use of a BAN system to support combat training by equipping each terminal apparatus with a light receiving sensor, and regarding a place where a terminal apparatus is attached that has detected the reception of laser light, which simulates a bullet or projectile, as being hit. For example, as a related technology, mobile terminals contact one another whereby, the position of contact is estimated based on vibration information and incline information at a transmission-side mobile terminal, and vibration information and include information at a receiving-side mobile terminal. For example, refer to Japanese Laid-Open Patent Publication No. 2009-188764.

Nonetheless, with the conventional technologies, it is difficult to identify where on a body, each terminal apparatus is attached. More specifically, for example, when a user attempts to set in each terminal apparatus, the place where terminal apparatus is attached to a body, the greater the number of terminal apparatuses is, the greater the burden on the user is.

SUMMARY

According to an aspect of an embodiment, a BAN system includes multiple terminal apparatuses connected by wireless communication, where a terminal apparatus of the multiple terminal apparatuses is configured to identify in which direction acceleration has changed, the direction being identified based on a measurement result of a sensor of the terminal apparatus, the sensor being configured to measure acceleration; and to refer to information that specifies corresponding to places where the plurality of terminal apparatuses is to be attached to a body, directions in which acceleration changes when the body performs a given behavior, and determines based on the identified direction, a place where the terminal apparatus is attached to the body.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting an application example of the BAN system 100;

FIG. 3 is a diagram depicting an example of hardware configuration of a terminal 102;

FIG. 4 is a block diagram depicting a functional example of a base station 101;

FIG. 5 is a block diagram depicting a functional configuration of the terminal 102;

FIG. 7 is a diagram depicting an example of the contents of a terminal attachment place determining table 511-eg1 in a case of the first application example;

FIGS. 8A and 8B are diagrams depicting an example of a connection process triggering behavior and an example of attachment of the terminal 102 in a case of the first application example;

FIG. 10 is a diagram depicting an example of the contents of the terminal attachment place determining table 511-eg2 in a case of the second application example;

FIGS. 11A and 11B are diagrams depicting an example of attachment of the terminal 102 in a case of the second application example;

FIG. 13 is a diagram depicting an example of identifying the attachment place of the terminal 102 by the base station 101;

FIG. 14 is a diagram depicting an example of identifying the base station 101 by the terminal 102;

FIG. 15 is a flowchart of an example of a procedure of the connection process of the base station 101 and the terminal 102 (part 1); and FIG. 16 is a flowchart of the example of the procedure of the connection process of the base station 101 and the terminal 102 (part 2).

DESCRIPTION OF EMBODIMENTS

An embodiment of a BAN system, a terminal apparatus, a BAN communications method, and a BAN communications program will be described in detail with reference to the accompanying drawings.

Figure 1A:
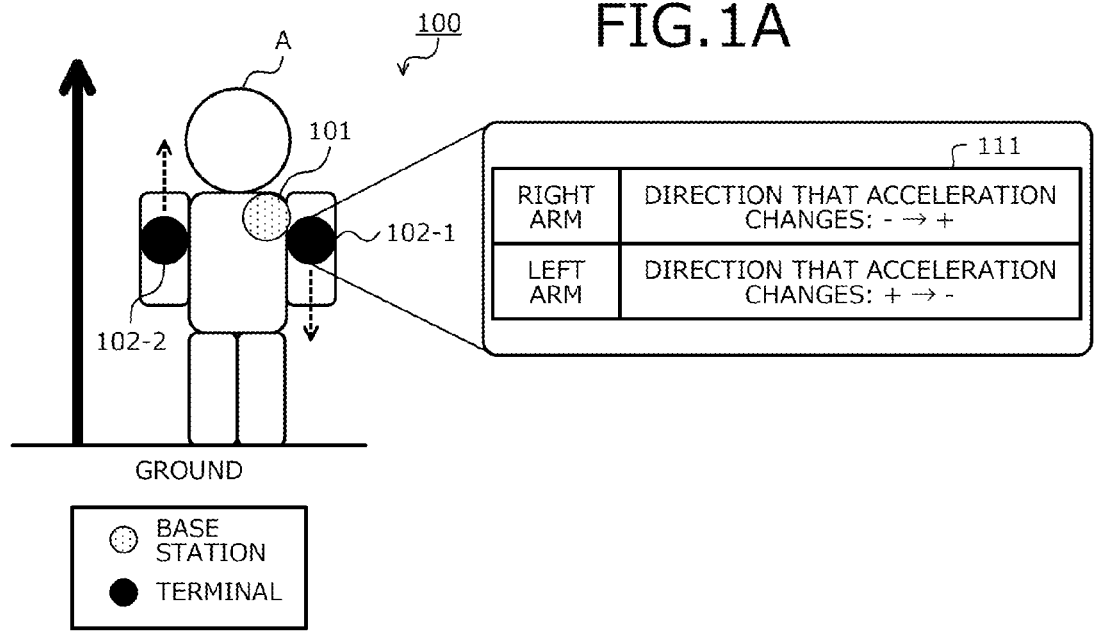
FIGS. 1A and 1B are diagrams depicting an operation example of a BAN system 100 according to an embodiment.
Figure 1B:
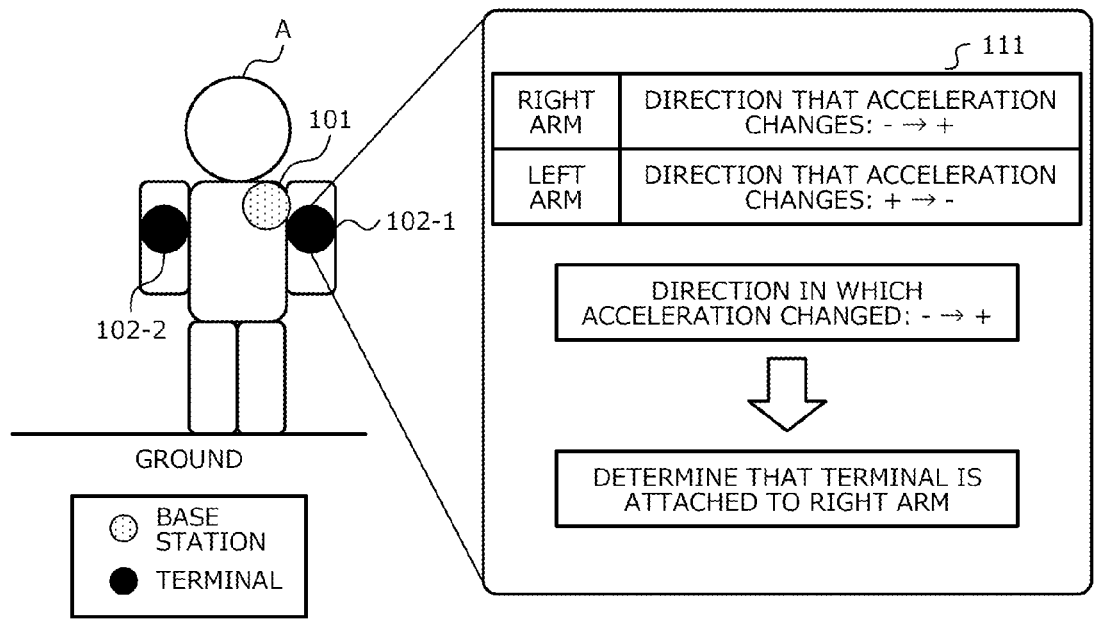

FIGS. 1A and 1B are diagrams depicting an operation example of a BAN system 100 according to the embodiment. The BAN system 100 has terminal apparatuses 102 respectively connected by wireless communication. The BAN system 100 may further have a base station apparatus 101 that is connected to the terminal apparatuses 102 by wireless communication.

Hereinafter, the base station apparatus 101 will be indicated as simply, "base station 101", and the terminal apparatuses 102 will be indicated as simply, "terminals 102". Furthermore, in FIGS. 1A AND 1B and thereafter, circles with hatching represent the base station 101 and solid circles represent the terminals 102.

The BAN system 100 is a system having a short-distance wireless network built by various types of sensors and devices attached to a body. The terminals 102 are attached to the body and are connected to the base station 101 by wireless communication. The body in the present embodiment may be mobile such as a person or a vehicle. The base station 101 and the terminals 102 perform a connection process and build the BAN system 100. The terminals 102 collect information related to the place of attachment.

Here, it is difficult to identify where on the body each of the terminals 102 is attached. More specifically, for example, when a user attempts to set in the terminals 102, places where the terminals 102 are attached, the greater the number of terminals 102 is, the greater the burden is on the user. Further, for example, it is conceivable that the user may preset in each terminal 102, the places where the terminals 102 are to be attached. In this case as well, as the number of terminals 102 increases, so does the burden on the user. Further, in a case where attachment places are preset, when the terminals 102 are actually attached, a measure has been taken so that the terminals 102 are not attached at places that differ from the places set in advance. Labeling each terminal 102 to indicate the attachment place and enable management may be considered as an example of such a measure. Nonetheless, implementation of such a measure increases the burden on the user.

Thus, the terminal 102 determines as an attachment place for the terminal 102, a place that corresponds to the direction in which acceleration changed as indicated by an accelerometer of the terminal 102. As a result, the BAN system 100 can identify the attachment place of a terminal by the user merely attaching the terminal 102 in a direction predetermined according to the place and performing a given behavior.

The given behavior will be referred to as a "connection process triggering behavior" hereinafter. The given behavior is preferably a behavior of a magnitude enabling a change in acceleration to be detected and, for example, in FIG. 1A, the connection process triggering behavior is assumed to be jumping vertically.

Behavior of the terminal 102 will be described in detail with reference to FIGS. 1A and 1B. In FIG. 1A, the BAN system 100 includes the base station 101 and terminals 102-1, 102-2. The terminals 102-1, 102-2 have an accelerometer that measures acceleration. The base station 101 and the terminals 102-1, 102-2 are attached to person A as the body. The terminals 102-1, 102-2 have information 111 that specifies corresponding to the places where the terminals 102-1, 102-2 are attached to the person, the direction that acceleration changes when the person performs a given behavior. Although not depicted in FIG. 1A, the terminal 102-2 also has the information 111. The information 111 depicted in FIG. 1A specifies that when the terminal 102 is attached to the right arm, the direction that acceleration changes is from a negative direction to a positive direction; and when the terminal 102 is attached to the left arm, acceleration changes from a positive direction to a negative direction.

When the terminals 102-1, 102-2 are attached, the terminals 102-1, 102-2 are attached in a direction that is predetermined according to the place of attachment and such that the contents of the information 111 are satisfied. In the example depicted in FIG. 1A, when attaching the terminal 102 to the right arm, person A attaches the terminal 102 such that the positive direction measured by the accelerometer of the terminal 102 is a downward direction. Similarly, when attaching the terminal 102 to the left arm, person A attaches the terminal 102 such that the positive direction measured by the accelerometer is an upward direction.

After attaching the terminals 102-1, 102-2, person A performs a connection process triggering behavior, whereby the accelerometers of the terminals 102-1, 102-2 detect changes in acceleration. To account for a margin of error, the terminals 102-1, 102-2 regard an acceleration value of a given value or greater to indicate a change in acceleration.

FIG. 1B depicts a state when person A has completed the connection process triggering behavior. The terminals 102-1, 102-2 identify based on measurement results of the accelerometers thereof, the directions in which acceleration changed. In FIG. 1B, based on the measurement results of the accelerometer of the terminal 102-1, the terminal 102-1 identifies the direction in which acceleration changed as being from a negative direction to a positive direction.

The terminal 102-1 refers to the information 111 and based on the identified directions, determines the place where the terminal 102-1 is attached to person A. In the example depicted in FIG. 1B, acceleration has changed from a negative direction to a positive direction and therefore, the terminal 102-1 determines that the terminal 102-1 is attached to the right arm. Although not depicted in FIG. 1B, by the same process, the terminal 102-2 determines that the terminal 102-2 is attached to the left arm. An application example of the BAN system 100 will be described with reference to FIG. 2.

FIG. 2 is a diagram depicting an application example of the BAN system 100. FIG. 2 depicts an example of a case where the BAN system 100 is applied to a training system 200. The training system 200 is a system that performs combat training. Several hundred people participate in the training system 200 and several dozen vehicles are used. In the example depicted in FIG. 2, persons A to D participate in the training system 200 and vehicles E, F are used in the training system 200.

As depicted in FIG. 2, the BAN system 100 is applied respectively to people and vehicles. Hereinafter, an example of application of the BAN system 100 to a person may be referred to as a first application example. "eg1" may be appended as reference characters related to the first application example. Further, an example of application of the BAN system 100 to a vehicle may be referred to as a second application example. "eg2" may be appended as reference characters related to the second application example.

When the BAN system 100 is applied to a person as the first application example, the base station 101 is attached to the torso of the person; and the terminals 102 are attached to a total of 6 sites, including the head, backpack, right arm, left arm, right leg, and left leg of the person. Further, when the BAN system 100 is applied to a vehicle as the second application example, the base station 101 is attached to the top of the vehicle; and the terminals 102 are attached to a total of 6 sites, including the front, back, right front side, left front side, right rear side, and left rear side of the vehicle. According to training details, the number of attachment sites may be increased. Further, the terminals 102 have a light receiving sensor that receives laser light, which simulates a bullet or projectile. An example of hardware configuration of the terminals 102 will be described with reference to FIG. 3.

Thus, the number of terminals 102 to be attached to each person and vehicle is 6 and manually setting the terminals 102 individually consumes a lot of time. Furthermore, since a large number of people and vehicles participate in the training system 200, it is difficult to separate the people and vehicles by a distance that prevents interference and it is difficult to have each person individually enter an electromagnetically shielded tent to perform the connection process. Thus, in the present embodiment, plural BAN systems 100 are set with other networks present at a short distance. In the example depicted in FIG. 2, the six terminals 102 and the base station 101 attached to person A are connected building BAN1 as the BAN system 100. Similarly, the six terminals 102 and the one base station 101 respectively attached to persons B to D, and the vehicles E, F, respectively build BAN2 to BAN6 as the BAN system 100.

FIG. 3 is a diagram depicting an example of hardware configuration of the terminal 102. Although the example depicted in FIG. 3, depicts hardware configuration of the terminal 102, the base station 101 has the same hardware as the terminal 102.

In FIG. 3, the terminal 102 includes a central processing unit (CPU) 301, read-only memory (ROM) 302, and random access memory (RAM) 303. The terminal 102 further includes electrically erasable programmable ROM (EEPROM) 304, an accelerometer 305, a signal processing unit 306, a light receiving sensor 307, a baseband large-scale integration (LSI) 308, a radio frequency integrated circuit (RFIC 309), and an antenna 310. The CPU 301 to the signal processing unit 306 and the baseband LSI 308 are respectively connected by a bus 311. The base station 101 may omit the signal processing unit 306 and the light receiving sensor 307.

The CPU 301 is a computation processing apparatus that governs overall control of the terminal 102. The ROM 302 is non-volatile memory storing therein programs such as a boot program. The RAM 303 is volatile memory used as a work area of the CPU 301.

The EEPROM 304 is non-volatile memory storing data therein, under the control of the CPU 301. The accelerometer 305 is a sensor that detects acceleration of the terminal 102. More specifically, the accelerometer 305 detects acceleration along 3 axes that are orthogonal to one another.

The signal processing unit 306 is an apparatus that analyzes laser light received by the light receiving sensor 307. More specifically, the signal processing unit 306 performs analysis and transmits obtained data to the CPU 301. The light receiving sensor 307 is a sensor that detects laser light, which simulates a bullet or projectile. In the present embodiment, the terminal 102 is configured by a main casing that houses the CPU 301 to the accelerometer 305 and the baseband LSI 308 to the antenna 310; and a sub-casing that houses the signal processing unit 306 and the light receiving sensor 307. The main casing has an attachment opening to attach the sub-casing; and the sub-casing has a cable of a given length and a terminal connecting an end of the cable to the main casing. Furthermore, the main casing, for example, is attached to the body by magnetic force.

The baseband LSI 308 converts baseband signals and digital signals. More specifically, the baseband LSI 308 converts digital signals from the CPU 301 into baseband signals and converts baseband signals from the RFIC 309 into digital signals. The RFIC 309 performs conversion of baseband signals and high-frequency signals. More specifically, the RFIC 309 converts baseband signals from the baseband LSI 308 into high-frequency signals and converts high-frequency signals from the antenna 310 into baseband signals. The antenna 310 transmits and receives high-frequency signals wirelessly communication with the base station 101.

FIG. 4 is a block diagram depicting a functional example of the base station 101. The base station 101 includes a control unit 400. The control unit 400 includes a detecting unit 401, an identifying unit 402, and a transmitting unit 403. The control unit 400 realizes functions of the units by the CPU of the base station 101 executing programs stored in a storage apparatus. The storage apparatus, more specifically, for example, is the ROM, the EEPROM, etc. of the base station 101. Further, process results of the units are stored to the RAM of the base station 101, a register of the CPU, etc.

The base station 101 can access a connection signal receiving sequence table 411. The connection signal receiving sequence table 411 is a table that corresponding to the sequence in which connection signals are received, specifies the place where the terminal 102 that transmitted the connection signal is attached. The connection signal receiving sequence table 411 is stored in a storage apparatus such as the ROM and the EEPROM of the base station 101. An example of the contents of the connection signal receiving sequence table 411 will be described with reference to FIGS. 6 and 9.

Based on measurement results obtained by the accelerometer of the base station 101, the detecting unit 401 detects that a change in acceleration has occurred.

The identifying unit 402 identifies where each of the terminals 102 is attached, based on the connection signals transmitted from the terminals 102. More specifically, for example, the identifying unit 402 refers to the connection signal receiving sequence table 411 and identifies the place that corresponds to the sequence in which the given connection signal was received, as the place where the terminal 102 that transmitted a given connection signal is attached. Further, for example, if the connection signal includes information specifying the place where the transmission source of the connection signal is attached, the identifying unit 402 identifies the place that can be identified from the information included in the connection signal, as the place where the terminal that transmitted the connection signal is attached.

The identifying unit 402 further identifies the terminals 102 that are attached to the same body as the base station 101, based on the connection signals received from the terminals 102, the times of a change in acceleration detected by the detecting unit 401, and the times when the connection signals are received. Here, the time may be the time based on a convention of regarding the time of startup of the base station 101 as 0 [seconds], or the Greenwich Mean Time (GMT) if the setting of such is possible.

More specifically, for example, the time when a change in acceleration detected by the detecting unit 401 occurred is assumed to be 1000 [milliseconds], and the transmission source of a connection signal received within the first 5-[milliseconds] or the last 5-[milliseconds] of a second given period of 100 [milliseconds] is assumed to be a terminal 102 that is attached to the same body. Further, the base station 101 is assumed to receive a connection signal from the first terminal 102 at the time point of 1003 [milliseconds], to receive a connection signal from the second terminal 102 at the time point of 1101 [milliseconds], and to receive a connection signal from the terminal 102 at the time point of 1149 [milliseconds]. In this case, the identifying unit 402 identifies the first terminal 102 and the second terminal 102 as terminals 102 that are attached to the same body as the base station 101. A more detailed identifying method will be described with reference to FIG. 13.

The transmitting unit 403, before a first given period elapses from the time when a connection signal is receive from a terminal 102, transmits to the terminal 102, a response signal that includes identification information of the base station 101. The first given period is a period that is less than or equal to the second given period. The second given period, for example, is 100 [milliseconds]. Further, the transmitting unit 403 may transmit a response signal to the terminal 102 when a random period of time elapses that is less than the first given period that is from the time when the connection signal is received from the terminal 102. The transmitting unit 403 may transmit a response signal multiple times to the terminal 102 from the time when the connection signal is received from the terminal 102 until the first given period elapses. The number of times that the response signal is transmitted may be several times; the transmitting unit 403 transmits the response signal a predetermined number of times. A detailed transmitting method will be described with reference to FIG. 13.

FIG. 5 is a block diagram depicting a functional configuration of the terminal 102. The terminal 102 has a control unit 500. The control unit 500 includes a direction identifying unit 501, a determining unit 502, a transmitting unit 503, and a base station identifying unit 504. The control unit 500 realizes functions of the units by the CPU 301 executing programs stored in a storage apparatus. The storage apparatus, more specifically, for example, is the ROM 302, the EEPROM 304, etc. Further, process results of the units are stored to the RAM 303, a register of the CPU 301, etc.

The terminal 102 can access a terminal attachment place determining table 511. The terminal attachment place determining table 511 is a table that stores information that specifies corresponding to the place where the terminal 102 is attached to a body, the direction in which acceleration changes when the body performs a given behavior. The terminal attachment place determining table 511 corresponds to the information 111 depicted in FIGS. 1A AND 1B. The terminal attachment place determining table 511 may further store information that specifies corresponding to the places where the terminals 102 are attached to the body, the sequence in which connection signals that include identification information of the terminals are to be transmitted to the base station 101. An example of contents of the terminal attachment place determining table 511 will be described with reference to FIGS. 7 and 10.

The direction identifying unit 501 identifies the direction in which acceleration has changed, based on acceleration measurement results obtained a sensor of the terminal 102.

The determining unit 502 refers to the terminal attachment place determining table 511, and based on the direction identified by the direction identifying unit 501, determines the place where the terminal 102 thereof is attached to the body. A detailed determination example will be described with reference to FIGS. 12A and 12B.

The transmitting unit 503 transmits to the base station 101, a connection signal that includes the identification information of the terminal 102, the connection signal being transmitted consequent to the arrival of a time that is based on the time when the direction identifying unit 501 identifies the direction in which acceleration changed and that is based on the sequence in which connection signals are to be transmitted to the base station 101, corresponding to the place determined by the determining unit 502. A detailed example will be described with reference to FIG. 13.

The base station identifying unit 504 identifies the base station 101 that is attached to the same body as the terminal 102 of the base station identifying unit 504, based on a response signal received between the time of transmission of the connection signal to the base station 101 and the elapse of the second given period, which is greater than or equal to the first given period. The base station identifying unit 504 may further identify the base station 101, based on the radio wave strength of the response signal received between the time when connection signal was transmitted to the base station 101 until the elapse of the second given period. A detailed identification example will be described with reference to FIG. 14.

With reference to FIGS. 6 to 8B, examples of the contents of the connection signal receiving sequence table 411 and the terminal attachment place determining table 511 and an example of attachment of the terminal 102 in the case of the first application example will be described.

Figure 6:
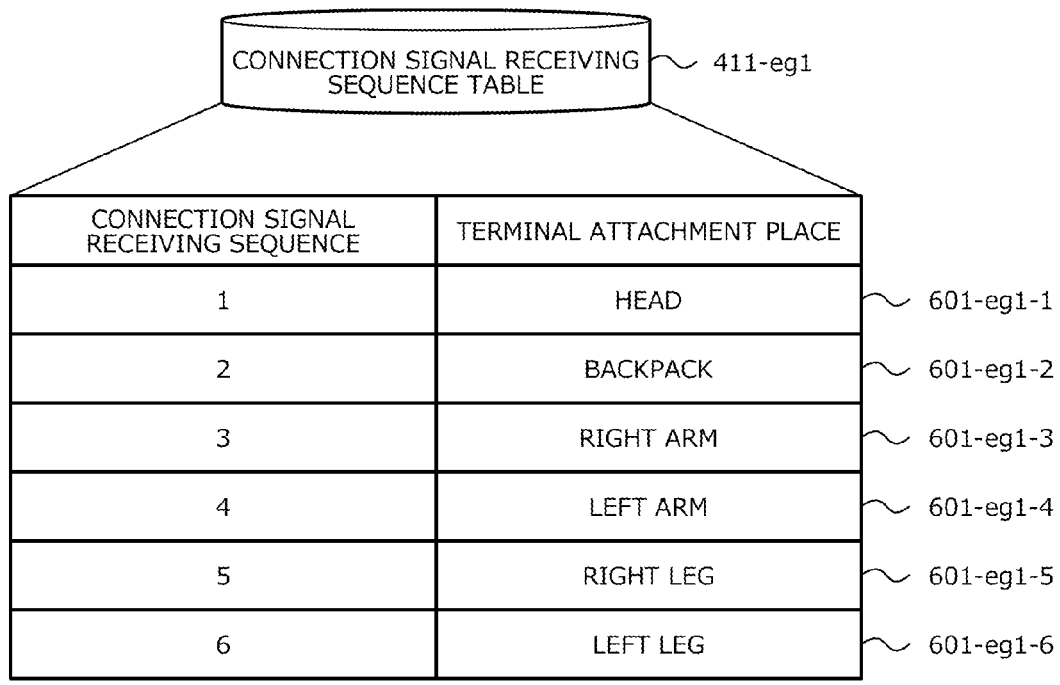
FIG. 6 is a diagram depicting an example of the contents of a connection signal receiving sequence table 411-eg1 in a case of a first application example.

FIG. 6 is a diagram depicting an example of the contents of the connection signal receiving sequence table 411-eg1 in the case of the first application example. The connection signal receiving sequence table 411-eg1 depicted in FIG. 6 includes records 601-eg1-1 to 6.

The connection signal receiving sequence table 411-eg1 has fields for the connection signal receiving sequence and the terminal attachment place. The connection signal receiving sequence field stores the sequence in which connection signals are received from the terminals 102. Terminal attachment place field stores information that specifies the place where a terminal 102 is attached. More specifically, the terminal attachment place field of the connection signal receiving sequence table 411-eg1 stores an identifier identifying any one among "the head", "backpack", "the right arm", "the left arm", "the right leg", and "the left leg".

For example, record 601-eg1-1 specifies that when the base station 101 receives the first connection signal, the terminal 102 that transmitted the first connection signal is attached to the head of a person.

FIG. 7 is a diagram depicting an example of the contents of the terminal attachment place determining table 511-eg1 in the case of the first application example. The terminal attachment place determining table 511-eg1 depicted in FIG. 7 has records 701-eg1-1 to 6.

The terminal attachment place determining table 511 has fields for x-axis acceleration, y-axis acceleration, z-axis acceleration, the terminal attachment place, and the connection signal transmitting sequence. The x-axis acceleration field stores details of a change in acceleration along the x-axis when the terminal 102 is attached to the place specified in the corresponding terminal attachment place field. The y-axis acceleration field stores details of a change in acceleration along the y-axis when the terminal 102 is attached to the place specified in the corresponding terminal attachment place field. The z-axis acceleration field stores details of a change in acceleration along the z-axis when the terminal 102 is attached to the place specified in the corresponding terminal attachment place field.

The terminal attachment place field stores information that specifies the place where the terminal 102 is attached. More specifically, the terminal attachment place field stores identifiers representing "the head" to "the left leg". The connection signal transmitting sequence field stores the sequence in which connection signals are to be transmitted to the base station 101 when the terminal 102 is attached to the place specified in the corresponding terminal attachment place field.

For example, record 701-eg1-1 specifies that when acceleration along the x-axis changes from positive to negative; and acceleration along the y-axis and along the z-axis, respectively, remains 0, the terminal 102 is attached to the head of a person. Record 701-eg1-1 further specifies that when the terminal 102 has been determined to be attached to the head of a person, the first connection signal is transmitted thereby.

Here, in order for the place where the terminal 102 has been determined to be attached from the contents of the x-axis to z-axis acceleration fields in records 701-eg1-1 to 6 and the actual place of attachment to match, the following 2 prerequisites are satisfied. The first prerequisite is that the person, to which the terminal 102 is attached, performs a predetermined connection process triggering behavior after the terminal 102 has been attached. The second prerequisite is that the terminal 102 is attached in a predetermined direction corresponding to the place of attachment and the connection process triggering behavior. In FIGS. 8A and 8B, an example of the connection process triggering behavior of the first prerequisite and an example of the attachment of the terminal 102 of the second prerequisite are described.

FIGS. 8A and 8B are diagrams depicting an example of the connection process triggering behavior and an example of the attachment of the terminal 102 in a case of the first application example. In FIG. 8A, the BAN system 100 is assumed to be built by the base station 101 and the terminals 102 attached to person C. FIG. 8A depicts an example in which person C jumps vertically as the connection process triggering behavior. FIG. 8A further depicts the direction of the axes of the accelerometers 305 of the terminals 102 respectively attached to the head, the backpack, the right arm, the left arm, the right leg, and the left leg.

For example, the terminal 102 attached to the head of person C is attached such that the positive direction of the x-axis of the accelerometer 305 coincides with an upward direction of person C; the positive direction of the y-axis coincides with a forward direction of person C; and positive direction of the z-axis coincides with rightward direction of person C. With such attachment, when person C jumps vertically, the accelerometer 305 of the terminal 102 attached to the head detects that acceleration along the x-axis changes from positive to negative and acceleration along the y-axis and along the z-axis remains 0.

FIG. 8B depicts an example of attachment of the terminal 102 such that the axes of the accelerometer 305 are in predetermined directions. For example, when attached to the head of person C, the terminal 102 is attached such that aspect A thereof is on top, whereby the positive direction of the x-axis of the accelerometer 305 is an upward direction of person C. Similarly, when attached to the backpack of person C, the terminal 102 is attached such that aspect B thereof is on top, whereby the negative direction of the x-axis of the accelerometer 305 is the upward direction of person C. When attached to the right arm of person C, the terminal 102 is attached such that aspect C thereof is on top, whereby the positive direction of the y-axis of the accelerometer 305 is the upward direction of person C. Further, when attached to the left arm of person C, the terminal 102 is attached such that aspect D thereof is on top, whereby the negative direction of the y-axis of the accelerometer 305 is the upward direction of person C. Although not depicted in FIG. 8B, the same is true for attachment to the right leg and the left leg of person C.

More specifically, the instruction manual for the terminal 102 includes, for example, "When attaching terminal to the head, attach with aspect A facing upward. When attaching terminal to backpack, attach with aspect B facing upward . . . ". The casing of the terminal 102 is of a design enabling aspect A, aspect B, aspect C, . . . to be recognized. Person C attaches the terminals according to the instruction manual.

In FIGS. 8A and 8B, although the connection process triggering behavior is assumed to be a vertical jump, the connection process triggering behavior may be another behavior. For example, the connection process triggering behavior may be a crouching behavior. In this case, by inverting the positive and negative directions specified in the x-axis to z-axis acceleration fields of records 701-eg1-1 to 6, the terminal 102 can correctly determine the place where the terminal 102 is attached.

With reference to FIGS. 9 to 11B, examples of the contents of the connection signal receiving sequence table 411 and the terminal attachment place determining table 511 and an example of attachment of the terminal 102 in the case of the second application example will be described.

Figure 9:
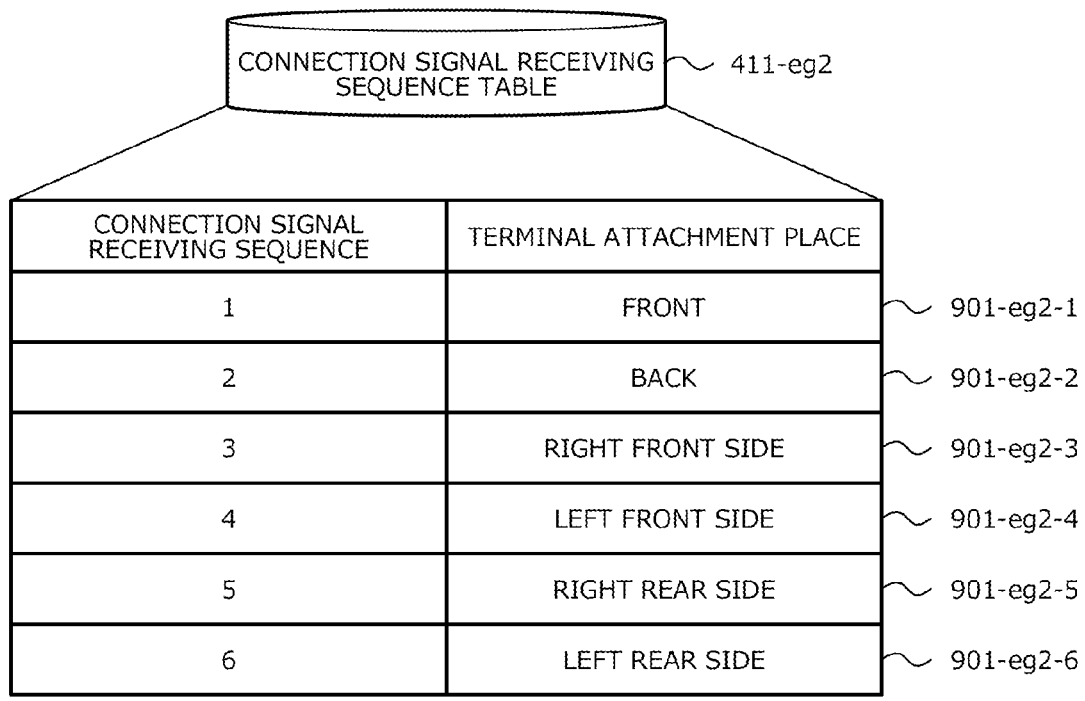
FIG. 9 is a diagram depicting an example of the contents of the connection signal receiving sequence table 411-eg2 in a case of a second application example.

FIG. 9 is a diagram depicting an example of the contents of the connection signal receiving sequence table 411-eg2 in the case of the second application example. The connection signal receiving sequence table 411-eg2 depicted in FIG. 9 includes records 901-eg2-1 to 6. The fields of the connection signal receiving sequence table 411-eg2 are the same as those of the connection signal receiving sequence table 411-eg1 depicted in FIG. 6 and therefore, description thereof is omitted. The connection signal receiving sequence table 411-eg2 differs from the connection signal receiving sequence table 411-eg1 in that the terminal attachment place field of the connection signal receiving sequence table 411-eg2 stores an identifier representing any one among "the front, "the back", "the right front side", "the left front side", "the right rear side", and "the left rear side".

For example, 901-eg2-1 specifies that when the base station 101 receives the first connection signal, the terminal 102 that transmitted the first connection signal is attached to the front of a vehicle.

FIG. 10 is a diagram depicting an example of the contents of the terminal attachment place determining table 511-eg2 in the case of the second application example. The terminal attachment place determining table 511-eg2 depicted in FIG. 10 has records 1001-eg2-1 to 6. The fields of the terminal attachment place determining table 511-eg are the same as those of the terminal attachment place determining table 511-eg1 depicted in FIG. 7 and therefore, description thereof is omitted. The terminal attachment place determining table 511-eg2 differs from the terminal attachment place determining table 511-eg1 in that the terminal attachment place field of the terminal attachment place determining table 511-eg2 stores an identifier representing any one among "the front" to "the left rear side".

For example, record 1001-eg2-1 specifies that when acceleration along the x-axis changes from positive to negative; and acceleration along the y-axis and along the z-axis remains 0, the terminal 102 is attached to the front of a vehicle. Record 1001-eg2-1 further specifies that when the terminal 102 has been determined to be attached to the front of a vehicle, the first connection signal is transmitted.

FIGS. 11A and 11B are diagrams depicting an example of attachment of the terminal 102 in the case of the second application example. In FIG. 11A, the BAN system 100 is assumed to be built by the base station 101 and the terminals 102 attached to vehicle F. FIG. 11A depicts an example in which vehicle F has moved forward and stopped as the connection process triggering behavior. FIG. 11A further depicts the axes of the accelerometers 305 of the terminals 102 respectively attached to the front, the back, the right front side, the left front side, the right rear side, and the left rear side of vehicle F.

For example, the terminal 102 attached to the front of vehicle F is attached such that the positive direction of the x-axis of the accelerometer 305 coincides with a forward direction of vehicle F; the positive direction of the y-axis coincides with an upward direction of vehicle F; and the positive direction of the z-axis coincides with a leftward direction of vehicle F. With such attachment, when vehicle F moves forward and stops, the accelerometer 305 of the terminal 102 attached to the front detects that acceleration along the x-axis changes from positive to negative and acceleration along the y-axis and along the z-axis remain 0.

FIG. 11B depicts an example of attachment of the terminal 102 such that the axes of the accelerometer 305 are in predetermined directions. For example, when attached to the front of vehicle F, the terminal 102 is attached with aspect B thereof abutting vehicle F such that aspect A of the terminal 102 becomes an anterior aspect, whereby the positive direction of the x-axis of the accelerometer 305 is in a forward direction of vehicle F. Similarly, when attached to the back, the right front side, the left front side, the right rear side, and the left rear side, the terminal 102 is attached such that the axes of the accelerometer 305 are in the directions depicted in FIG. 11A. As a result, aspects of the terminals 102 are attached to vehicle F.

In some cases, the terminal 102 may be attached such that the aspect having the attachment opening that attaches the sub-casing of the main casing of the terminal 102 abuts vehicle F. For example, aspect B depicted in FIG. 11B is assumed to have the attachment opening and the terminal 102 is assumed to be attached such that aspect B abuts vehicle F. When the terminal 102 is attached to vehicle F, magnets are attached to four corners of aspect B. The cable of the sub-casing passes between the magnets and is attached to the attachment opening of the main casing. By configuring the terminal 102 with such a hardware configuration, the light receiving sensor 307 can be prevented from being concealed by the terminal 102 or vehicle.

Although the examples depicted in FIGS. 8A, 8B, 11A, and 11B are examples of attachment such that the axes of the accelerometer 305 are orthogonal or parallel to the ground, attachment may be such that the axes of the accelerometer 305 are not orthogonal or parallel to the ground.

For example, in the case of the first application example, the terminal attachment place determining table 511-eg1 is assumed to have a record that specifies that when acceleration along the x-axis and acceleration along the y-axis changes from positive to negative and acceleration along the z-axis remains 0, the terminal 102 is attached to the abdomen of a person. The terminal 102 attached to the abdomen of a person is attached such that the directions of vectors (x, y, z)=(1, 1, 0) coincide with the upward direction of person C. With such attachment, when person C jumps vertically, the accelerometer 305 of the terminal 102 attached to the abdomen detects that acceleration along the x-axis and acceleration along the y-axis changes from positive to negative and acceleration along the z-axis remains 0.

With reference to FIG. 12A to 14, an example where the terminal 102 determines the attachment place thereof; the base station 101 identifies the attachment place of the terminal 102; and the terminal 102 identifies the base station 101 will be described as the connection process. With reference to FIGS. 12A to 14, description will be given using the first application example. In the connection process, the base station 101 and the terminals 102 use a common control channel to communicate. After completion of the connection process, the base station 101 and the terminals 102 communicate using normal operation channels assigned to each BAN.

In the description of FIGS. 12A to 14, the base station 101 attached to person C is referred to as the base station 101-C. Further, the six terminals 102 attached to person C are referred to as the terminals 102-C-1 to 6.

Figure 12A:
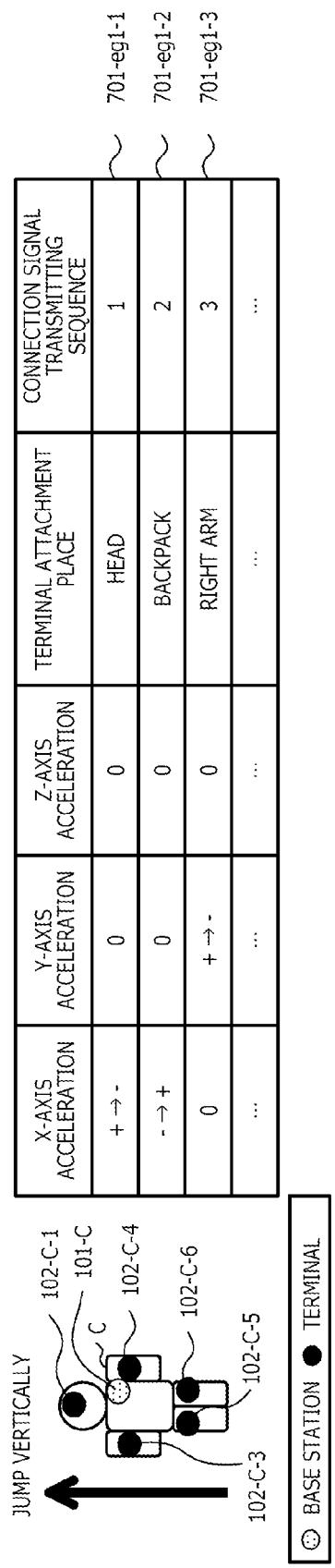
FIGS. 12A and 12B are diagrams depicting an example of determining the attachment place of the terminal 102 by the terminal 102.
Figure 12B:
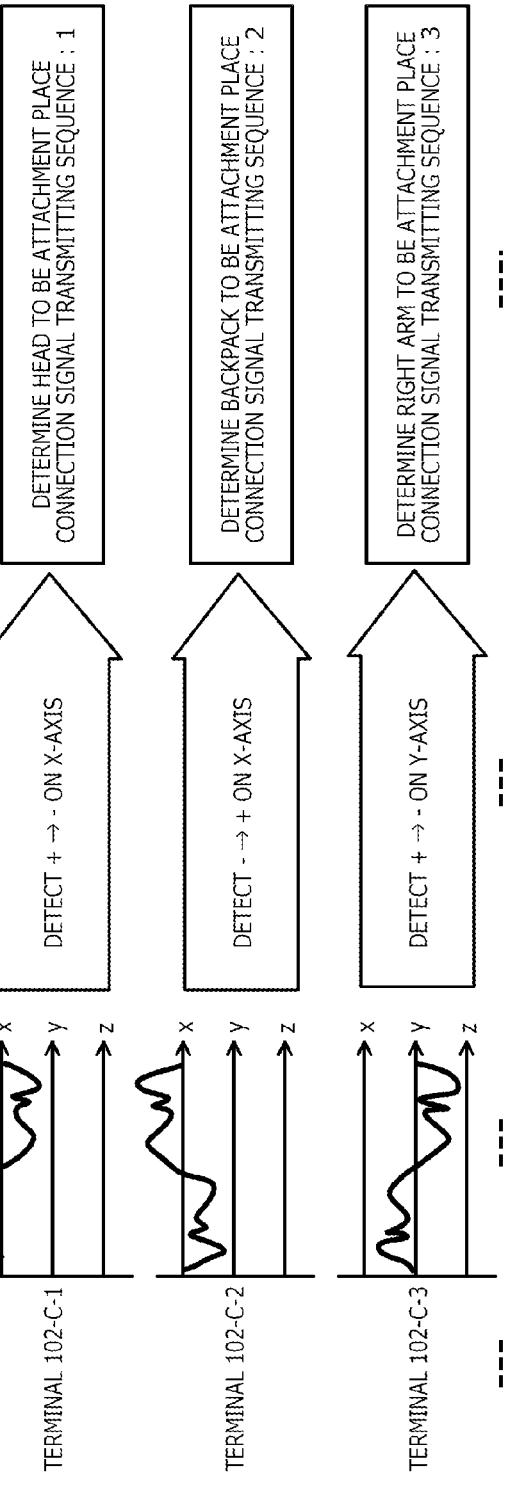

FIGS. 12A and 12B are diagrams depicting an example of determining the attachment place of the terminal 102 by the terminal 102. As depicted in FIG. 12A, after attaching the base station 101-C and the terminals 102-C-1 to 6, person C jumps vertically as the connection process triggering behavior. The accelerometers 305 of the terminals 102-C-1 to 6 detect changes in acceleration consequent to the vertical jump.

FIG. 12B depicts measurement results of the accelerometers 305 of the terminals 102-C-1 to 3, as graphs. The terminal 102-C-1 detects that acceleration along the x-axis changes from positive to negative and that acceleration along the y-axis and along the z-axis remains 0. Accordingly, the terminal 102-C-1 is assumed to refer to record 701-eg1-1 and to determine the head to be the attachment place of the terminal 102-C-1 and the transmission sequence for the connection signal to be first. Similarly, the terminal 102-C-2 is assumed to refer to record 701-eg1-2 and to determine the backpack to be the attachment place attachment place of the terminal 102-C-2 and the transmission sequence for the connection signal to be second. Further, the terminal 102-C-3 is assumed to refer to record 701-eg1-3 and to determine the right arm to be the attachment place of the terminal 102-C-3 and the transmission sequence of the connection signal to be third.

FIG. 13 is a diagram depicting an example of identifying the attachment place of the terminal 102 by the base station 101. As described with reference to FIGS. 12A and 12B, the accelerometers 305 of the terminals 102-C-1 to 6 detect the direction of changes in acceleration, consequent to person C jumping vertically. Here, at the same time that the accelerometers 305 of the terminals 102-C-1 to 6 detect a change in acceleration, the accelerometer 305 of the base station 101-C also detects that a change in acceleration has occurred. The base station 101-C regards time t0 when the change in acceleration occurred as a reference time and enters a receiving state of waiting for a connection signal from the terminals 102, fixed period ft. The terminals 102-C-1 to 6 also regard as the reference time, the time t0 when the direction in which acceleration changed was identified and transmit a connection signal to the base station 101-C. Here, the connection signal is assumed to include the identification information of the terminal 102 that transmitted the connection signal.

The terminals 102-C-1 to 6 transmit connection signals to the base station 101-C, according to the connection signal transmissions sequence depicted in FIG. 12B. A timing chart 1301 depicted in FIG. 13 depicts the timing at which the terminals 102-C-1 to 6 transmit connection signals to the base station 101-C. In the timing chart 1301, the horizontal axis represents time. In the timing chart 1301, rectangles with hatching represent detection of a change in acceleration by the accelerometers 305 of the terminals 102-C-1 to 6; or that the accelerometer 305 of the base station 101-C also detects that a change in acceleration occurred. Solid rectangles in the timing chart 1301 represent transmission of connection signals by the terminals 102-C-1 to 6 or the base station 101-C; or transmission of a response signal for a connection signal. White rectangles in the timing chart 1301 represent the receiving state of waiting for a connection signal or a response signal by the terminals 102-C-1 to 6 or the base station 101-C.

Since the terminal 102-C-1 is the first to transmit the connection signal, the terminal 102-C-1 transmits the connection signal immediately after the reference time. After transmitting the connection signal, the terminal 102-C-1 enters the receiving state from the reference time t0 until the second given period pt2 elapses. After receiving the connection signal, the base station 101-C refers to the connection signal receiving sequence table 411-eg1 and determines that the terminal 102-C-1 is attached to the head since the connection signal therefrom was the first to be received.

Receipt of the connection signal within the fixed period ft means that the reference times of the terminal 102-C-1 and of the base station 101-C coincide. Accordingly, the base station 101-C determines that terminal 102-C-1 is attached to the same body as the base station 101-C. Thus, the base station 101-C can exclude connection signals from the terminals 102 of other BAN systems by processing the connection signals received within the fixed period ft. More specifically, person C jumps vertically at a timing that differs from the timing at which a person nearby jumps vertically. Therefore, the base station 101-C can exclude the connection signals from terminals 102 that are not attached to person C whereby, errant setting can be suppressed.

After the fixed period ft has elapsed and when a random period that is less than the first given period pt1, which is less than or equal to the second given period pt2, has elapsed, the base station 101-C, which has received the connection signal, transmits to the terminal 102-C-1, a response signal for the connection signal. Here, the sum of the first given period pt1 and the fixed period ft is equivalent to the second given period pt2. Further, the base station 101-C transmits the response signal multiple times until the first given period pt1 elapses. Here, the response signal is assumed to include the identification information of the base station 101-C.

When the random period has elapsed, a response signal is transmitted whereby, the base station 101-C can prevent the response signal from being sent at the same timing as the response signal transmitted by the base station 101 of another BAN system and can prevent interference at the terminal 102-C-1. Further, by transmitting the response signal multiple times, even if a response signal transmitted at a given timing happens to interfere, the terminal 102-C-1 can properly receive the response signal by the response signal being transmitted at another timing. In the example depicted in FIG. 13, the second given period pt2 is assumed to be 100 [milliseconds]; the period at which the response signal is transmitted is assumed to be 3 [milliseconds]; and the response signal is assumed to be transmitted three times. In this case, from among 33 transmission timing candidates, the base station 101-C randomly selects three and sends the response signal at the selected timings.

Thereafter, similarly, at time t1 when the first given period pt1 elapses, the base station 101-C again enters the receiving state of waiting for a connection signal from the terminal 102 during the fixed period ft. Further, the terminal 102-C-2, which is to transmit a connection signal second, transmits the connection signal to the base station 101-C at time t1 when the second given period pt2 elapses.

FIG. 14 is a diagram depicting an example of identifying the base station 101 by the terminal 102. As described with reference to FIG. 13, terminal 102-C-1 receives the response signal from the base station 101-C multiple times. The terminal 102-C-1 may further receive a response signal transmitted by the base station 101 of another BAN system.

Thus, to identify the base station 101-C that is attached to the same body as the terminal 102-C-1, the terminal 102-C-1 identifies the base station 101-C based on the Received Signal Strength Indication (RSSI) of the response signal. Here, from among the base stations that transmitted response signals received by the terminal 102-C-1, the base station 101-C that is attached to the same body as the terminal 102-C-1 is the one nearest to the terminal 102-C-1 and therefore, the response signal thereof has the greatest radio wave strength.

Graph 1401 depicted in FIG. 14 represents one example of the response signal received by the terminal 102-C-1 between time t0 to time t1 depicted in FIG. 13. The horizontal axis of graph 1401 represents time; and the vertical axis represents RSSI. Solid rectangles in graph 1401 represent the RSSI of the response signal from the base station 101-A attached to person A. Similarly, rectangles with hatching in graph 1401 represent the RSSI of a response signal from a base station 101-B attached to person B. White rectangles in graph 1401 represent the RSSI of a response signal from a base station 101-C attached to person C.

The terminal 102-C-1 identifies the transmission source having the greatest number of response signals for which RSSI is greater than or equal to a given threshold to be the base station 101 that is attached to the same person as the terminal 102-C-1. Graph 1401 indicates that while executing the connection process, person A becomes close to person C and as a result, the terminal 102-C-1 receives one time, a response signal that is from the base station 101-A and exceeds the given threshold. Even under such circumstances, the terminal 102-C-1 identifies the base station 101-C, which has the greatest number of response signals that are greater than or equal to the given threshold, to be the base station 101 that is attached to the same person as the terminal 102-C-1.

With reference to FIGS. 15 and 16, flowcharts of operations executed in coordination by the base station 101 and the terminals 102 will be described.

FIG. 15 is a flowchart of an example of a procedure of the connection process of the base station 101 and the terminal 102 (part 1). FIG. 16 is a flowchart of the example of the procedure of the connection process of the base station 101 and the terminal 102 (part 2). The connection process is a process of building connecting the base station 101 and terminals 102 to build one BAN system.

The base station 101 is powered on and activated (step S1501). The base station 101 performs initial setting (step S1502). For example, the base station 101 refers to the connection signal receiving sequence table 411 and reads out the number of terminals 102 to be attached to the same body as the base station 101 and the places of attachment, and further sets a value of the normal operation channel. The terminal 102 is powered on and activated (step S1503).

After the operation at step S1502 has been completed, the base station 101 uses the accelerometer 305 thereof to detect acceleration that is consequent to the connection process triggering behavior (step S1504). Similarly, the terminal 102 uses the accelerometer 305 thereof to detect acceleration that is consequent to the connection process triggering behavior (step S1505).

After the operation at step S1504 has been completed, the base station 101 sets the time at a change in acceleration occurred as a reference time (step S1506). After the operation at step S1505 has been completed, the terminal 102 refers to the terminal attachment place determining table 511 determines the attachment place of thereof from changes along the axes of the accelerometer 305 (step S1507). The terminal 102 waits for a period that corresponds to the connection signal transmitting sequence for the attachment place (step S1508).

After the operation at step S1506 has been completed, the base station 101 transitions to the receiving state for the fixed period ft (step S1601). After the operation at step S1508 has been completed, the terminal 102 transmits a connection signal (step S1602). The terminal 102 transitions to the receiving state for the second given period (step S1603).

The base station 101 receives connection signals until the fixed period ft has elapsed (step S1604). The base station 101 refers to the connection signal receiving sequence table 411 and from the reception sequence of the connection signal, identifies the attachment place of the terminal 102 that transmitted the connection signal (step S1605). The base station 101 randomly delays and transmits a response signal for the connection signal multiple times, until the first given period pt1 elapses (step S1606).

After the second given period pt2 has elapsed, the terminal 102 identifies as the base station attached to the same body as the terminal 102, the transmission source from which the most response signals having RSSI that is greater than or equal to a given threshold were received among the response signals (step S1607). After the operation at step S1607 has been completed, the terminal 102 ends the connection process.

After the first given period pt1 elapses, the base station 101 determines whether processing has been repeatedly performed for the number of records in the connection signal receiving sequence table 411 (step S1608). If processing has not been performed for the number of records in the connection signal receiving sequence table 411 (step S1608: NO), the base station 101 transitions to the operation at step S1601.

On the other hand, if processing has been performed for the number of records in the connection signal receiving sequence table 411 (step S1608: YES), the base station 101 ends the connection process. After completion of the connection process, the base station 101 and the terminals 102 transition to normal operation. Execution of the connection process enables the BAN system to be built by the base station 101 and the terminals 102 that are attached to the same body.

As described, according to the BAN system 100, the terminal 102 determines as the attachment place thereof, a place that corresponds to the direction in which acceleration changed as indicated by the accelerometer 305 of the terminal 102. As a result, the BAN system 100 can identify the attachment place of the terminal 102 by the user merely attaching the terminals 102 in a direction predetermined according to place and performing a connection process triggering behavior. Further, by the user merely performing the connection process triggering behavior, the attachment places of multiple terminals 102 can be identified collectively, enabling the burden on the user to be reduced. Since setting errors by the user can be suppressed, the load placed on the terminal 102 due to repeated resetting consequent to setting errors can be suppressed.

Further, according to the BAN system 100, the terminal 102 may transmit to the base station 101, a connection signal that includes the identification information of the terminal 102, the connection signal being transmitted consequent to the arrival of a time that is based on the time when the direction in which acceleration changed was identified and that is based on the sequence in which connection signals are to be transmitted corresponding to the determined place. As a result, the BAN system 100 prevents interference caused by multiple terminals 102 simultaneously transmitting connection signals and thereby, enables the base station 101 to be notified of the places where the terminals 102 are attached.

Further, according to the BAN system 100, the base station 101 may identify terminals 102 that are attached to the same body as the base station 101, based on the connection signals received from the terminals 102, the time when a change in acceleration occurred, and the time when the connection signals were received. As a result, the base station 101 can exclude connections signals that are from terminals 102 that are attached to another body, enabling errant setting to be suppressed. Accordingly, even when another nearby BAN system 100 in executing the connection process, the BAN system 100 can perform the connection process without moving to a distance that does not cause interference.

Further, according to the BAN system 100, the terminal 102 may identify based on response signals received from the time when the connection signal is transmitted to the base station 101 until the elapse of the second given period, the base station 101 that is attached to the same body as the terminal 102. Thus, the terminal 102 can exclude to a certain extent, response signals that are from base stations 101 attached to other bodies and can suppress errant setting by limiting the period during which response signals are received.

Further, according to the BAN system 100, the base station 101 may transmit response signals to the terminals 102, when a random period elapses that is less than the first given period that is from the times when connection signals are received from the terminals. As a result, the base station 101 can suppress interference with response signals of other base stations 101.

Further, according to the BAN system 100, the base station 101 transmits the response signal to the terminal 102 multiple times and based on the radio wave strength of the response signal, the terminal 102 may identify the base station apparatus that is attached to the same body. As a result, even if a response signal received at a given timing happens to interfere, the terminal 102 can properly receive the response signal by the response signal being transmitted at another timing.

The BAN system 100 can complete the connection process in a period of time that is about number of terminals 102×the second given period and thus, can complete the connection process in a shorter period time that setting by the user. Further, the body to which the terminals 102 are attached suffices to be a body that can perform the connection process triggering behavior and, for example, may be a dog or a horse. For example, the user trains the dog in advance to jump vertically, as the connection process triggering behavior. The user attaches the base station 101 to the dog and after attaching the terminals 102 in the predetermined directions, has the dog jump. Consequently, the terminals 102 are able to identify the respective attachment places.

The BAN communications method described in the present embodiment may be implemented by executing the BAN communications program on a computer such as a personal computer and a workstation. The BAN communications program is stored on a non-transitory, computer-readable recording medium such as a hard disk, a flexible disk, a CD-ROM, an MO, and a DVD, read out from the computer-readable medium, and executed by the computer. The BAN communications program may be distributed through a network such as the Internet.

According to one aspect of the embodiment, an effect is achieved in that places where a terminal apparatus is attached to a body can be identified.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A body area network system comprising:
a plurality of terminal apparatuses connected by wireless communication, wherein
a terminal apparatus of the plurality of terminal apparatuses is configured to:
identify in which direction acceleration has changed, the direction being identified based on a measurement result of a sensor of the terminal apparatus, the sensor being configured to measure acceleration, and
refer to information that specifies corresponding to places where the plurality of terminal apparatuses is to be attached to a body, directions in which acceleration changes when the body performs a given behavior, and determines based on the identified direction, a place where the terminal apparatus is attached to the body.

2. The body area network system according to claim 1, further comprising
a base station apparatus that is connected to the plurality of terminal apparatuses by wireless communication, wherein
the information specifies corresponding to the places where the plurality of terminal apparatuses is to be attached to the body, a sequence in which connection signals that include identification information of the plurality of terminal apparatuses are to be transmitted to the base station apparatus,
the terminal apparatus transmits a connection signal that includes the identification information of the terminal apparatus to the base station apparatus, consequent to a time arriving that is based on a time when the direction in which acceleration changed is identified and that is based on the sequence in which the connection signal is to be transmitted corresponding to the determined place, and
the base station apparatus identifies based on the connection signals received from the plurality of terminal apparatuses, the places where the plurality of terminal apparatuses is attached.

3. The body area network system according to claim 2, wherein
the base station apparatus is attached to the body, which is among a plurality of bodies,
the base station apparatus detects that a change in acceleration occurred, the change being detected based on a measurement result of a sensor of the base station apparatus, the sensor being configured to measure acceleration, and
the base station apparatus identifies the terminal apparatus that is attached to the body to which the base station apparatus is attached, the terminal apparatus being identified based on the connection signal received from the terminal apparatus, a time when the detected change in acceleration occurred, and a time when the connection signal is received from the terminal apparatus.

4. The body area network system according to claim 3, wherein
the base station apparatus transmits to the terminal apparatus, a response signal that includes identification information of the base station apparatus, the response signal being transmitted between the time when the connection signal is received from the terminal apparatus and a time when a first given period elapses, and
the terminal apparatus identifies the base station apparatus that is attached to the body to which the terminal apparatus is attached, the base station being identified based on the response signal received between a time when the connection signal is transmitted to the base station apparatus and a time when a second given period that is greater than or equal to the first given period elapses.

5. The body area network system according to claim 4, wherein
the base station apparatus transmits the response signal to the terminal apparatus, when a random period elapses that is less than the first given period, which is from the time when the connection signal is received from the terminal apparatus.

6. The body area network system according to claim 4, wherein
the base station apparatus transmits the response signal to the terminal apparatus multiple times from the time when the connection signal is received from the terminal apparatus until the first given period elapses, and
the terminal apparatus identifies the base station apparatus that is attached to the body, the base station apparatus being identified based on radio wave strength of the response signal received between the time when the connection signal is transmitted to the base station apparatus and the time when the second given period elapses.

7. A terminal apparatus among a plurality of terminal apparatuses connected by wireless communication, the terminal apparatus comprising:
a sensor configured to measure acceleration; and
a processor configured to:
identify in which direction acceleration has changed, based on a measurement result of the sensor, and
refer to information that specifies corresponding to places where the terminal apparatus is to be attached to a body, directions in which acceleration changes when the body performs a given behavior, and determine based on the identified direction, a place where the terminal apparatus is attached to the body.

8. A body area network communications method executed by a terminal apparatus among a plurality of terminal apparatuses connected by wireless communication, the body area network communications method comprising:
identifying in which direction acceleration has changed, the direction being identified based on a measurement result of a sensor of the terminal apparatus, the sensor being configured to measure acceleration; and
referring to information that specifies corresponding places where the plurality of terminal apparatuses are to be attached to a body, directions in which acceleration changes when the body performs a given behavior and determining based on the identified direction, a place where the terminal apparatus is attached to the body.

9. A non-transitory, computer-readable recording medium storing therein a body area network communications program that causes a terminal apparatus among a plurality of terminal apparatuses connected by wireless communication to execute a process comprising:
identifying in which direction acceleration has changed, the direction being identified based on a measurement result of a sensor of the terminal apparatus, the sensor being configured to measure acceleration; and referring to information that specifies corresponding places where the plurality of terminal apparatuses are to be attached to a body, directions in which acceleration changes when the body performs a given behavior and determining based on the identified direction, a place where the terminal apparatus is attached to the body.

\* \* \* \* \*